US006947064B1

(12) United States Patent
Hahn et al.

(10) Patent No.: US 6,947,064 B1
(45) Date of Patent: Sep. 20, 2005

(54) METHOD FOR DISPLAYING A PERSPECTIVE IMAGE AND DISPLAY DEVICE FOR AT LEAST ONE PASSENGER OF A MOTOR VEHICLE

(75) Inventors: Stefan Hahn, Ulm (DE); Walter Ziegler, Stuttgart (DE)

(73) Assignee: DaimlerChrysler AG, (DE)

( * ) Notice: Subject to any disclaimer, the term of this patent is extended or adjusted under 35 U.S.C. 154(b) by 340 days.

(21) Appl. No.: 10/069,647

(22) PCT Filed: Aug. 4, 2000

(86) PCT No.: PCT/DE00/02598

§ 371 (c)(1),
(2), (4) Date: May 2, 2002

(87) PCT Pub. No.: WO01/15928

PCT Pub. Date: Mar. 8, 2001

(30) Foreign Application Priority Data

Aug. 27, 1999 (DE) ................................ 199 40 723

(51) Int. Cl.[7] ................................................ G06T 15/00
(52) U.S. Cl. ........................ 345/958; 345/427; 701/301
(58) Field of Search ............................ 701/3, 300, 301, 701/302; 340/461; 359/630; 345/427, 771, 345/958, 959, 970

(56) References Cited

U.S. PATENT DOCUMENTS

| | | | | |
|---|---|---|---|---|
| 5,519,536 A * | 5/1996 | Hoehn | 359/630 |
| 5,764,139 A * | 6/1998 | Nojima et al. | 340/461 |
| 6,038,496 A * | 3/2000 | Dobler et al. | 701/3 |

FOREIGN PATENT DOCUMENTS

| | | | |
|---|---|---|---|
| DE | 43 19 904 A1 | 12/1994 | B60Q 9/00 |
| DE | 195 39 799 A1 | 5/1996 | B60K 35/00 |
| DE | 197 38 764 A1 | 3/1999 | G06F 19/00 |

* cited by examiner

*Primary Examiner*—Almis R. Jankus
(74) *Attorney, Agent, or Firm*—Pendorf & Cutliff

(57) ABSTRACT

The invention relates to a method for displaying a perspective image and to a display device for at least one passenger of a motor vehicle. The air of the vehicle is to guarantee by simple means a high road safety that is substantially independent of the knowledge and skills of the driver. To this end, a method for displaying a perspective image (B) with one image element (4A to 4H) for at least one passenger of a motor vehicle is provided, said image (B) representing the view of the passenger. According to the inventive method, the image element (4A to 4H) is changed in at least one size depending on the forward travel way (F), on at least one operational parameter of the motor vehicle and/or on at least one parameter of an object (6) identified in the range of the travel way (F).

24 Claims, 4 Drawing Sheets

METHOD FOR DISPLAYING A PERSPECTIVE IMAGE AND DISPLAY DEVICE FOR AT LEAST ONE PASSENGER OF A MOTOR VEHICLE

BACKGROUND OF THE INVENTION

1. Field of the Invention

The invention concerns a method for displaying a perspective image with an image element for at least one occupant of a motor vehicle. Beyond this, a display device is proposed for at least one occupant of a vehicle with a segment for display of a perspective image.

2. Description of the Related Art

Conventionally, during the operation of a motor vehicle, for example a personal automobile, considered in particular from the viewpoint of the vehicle operator, a large amount of information must be processed—information regarding developments in the traffic environment and information from instruments in the dashboard. The information in the instruments in the dashboard may be displayed in conventional analog displays as well as, increasingly, in electronic displays. The appearance and mode of the representations in the electronic displays is conventionally in the shape of bar graphs, static images or numeric displays, as known for example from the periodically “auto-motor-sport”, 9/87, pages 170 through 174.

The occupant thus must combine very many pieces of information from the observation of the present and future traffic environment together with the technical information provided electronically by the dashboard, for example the speed of the own vehicle, in order to be able to safely control the vehicle in traffic. In addition, the occupant is forced to rapidly react in the case of a dangerous situation, so that their ability to glance downwards towards the dashboard and therewith the information displayed therein is very limited. Instead, the driver is usually forced to rely on his abilities and experience to respond to the dangerous situation.

For the rapid overcoming of a particular dangerous situation, in particular that of collision or near collision, increasingly so-called proximity alarms are known, which warn the vehicle operator in the case of a too narrow distance between the own vehicle to the preceding vehicle by emitting acoustic or optical signals—tones or vocalized signals or, as the case may be, warning lights or bar graphs, so that the operator can reduce his speed and thereby increase the spacing. A disadvantage with all of these systems is that the occupant must separately interpret the environment and the therein occurring dangers as well as the therewith associated warning signals. This requires time, which is not available, particularly in the case of a dangerous situation in which response must be made within a few seconds.

SUMMARY OF THE INVENTION

The invention is thus concerned with the task of providing a process for displaying traffic information, which makes possible in particularly simple means and manner a high traffic safety, which is substantially independent from the knowledge, experience and ability of the operator. The invention is further concerned with the task of providing a particularly suitable display device for at least one occupant of a vehicle.

The first mentioned task is inventively solved by a process for displaying a perspective display with an image element for at least one occupant of a vehicle, wherein the display represents the perspective or view of the occupant, in which the image element is changed in at least one characteristic depending on the forward travel way (roadway), one operational parameter of the motor vehicle, and/or at least one parameter of an object identified in the environment of the travel way.xx The invention is based upon the idea, that the high mental demands on an occupant of a vehicle, in particular the operator or copilot, from the large amount of particularly complex information, should be minimized to the extent that by a suitable process or, as the case may be, suitable device, the occupant is supported for a safe operation of the vehicle. For this, the information to be processed by the occupant is brought into close proximity with the actual situation, that is, within the field of view of the situation as seen by the occupant. This makes possible the simple and spontaneous interpretation of the traffic situation, in particular the instantaneous traffic situation. For this particularly advantageously a perspective image is produced and displayed representing the view of the occupant, wherein an object lying in the field of view of the occupant is modified in this display, such that the image element changes its characteristic in adaptation to the current vehicle situation. Therewith in particularly simple mode and manner, for example by a suitable marking technique in the image element, a hazardous situation occurring at the moment is enhanced or highlighted in the display, or an important element, for example a pedestrian or a preceding vehicle, is highlighted within the display. The term roadway is herein in particular understood to mean of the forward lying path to be traveled by the own vehicle, for example a road or highway.

Preferably the size of the image element is changed in its shape, color, size, position and/or dimensions. For example, in the case of a particularly close distance between the own vehicle and an identified object, for example a preceding vehicle, obstruction or pedestrian, this object is marked as a possible source of danger by a change in color, for example from white to red. Preferably in addition the distance as well as the position of a representation of an identified object is adapted to the continuously changing distancing, so that the occupant actually takes notice of this change as in the actual view—such as, with moving away from or approaching of the vehicle the object gets smaller or, as the case may be, gets larger.

Preferably the image element is displayed as a three dimensional representation. That is, the image element is represented with shading, masking, perspective, vertical position in the image, as would be observed in the actual field of view of the occupant. Thereby, a representation substantially corresponding to reality is made possible, so that the occupant, in particular the operator of the vehicle can grasp the instantaneous situation particularly simply and rapidly. In a particularly preferred embodiment a vehicle preceding the own vehicle is displayed as an image element. Therein the image element representing the roadway or travel way shows the perspective representation of the driving situation in one plane, preferably from an elevated perspective or the view of the vehicle operator. The path of travel is projected quasi in perspective representation onto this plane. The plane is formed by a display surface in the dashboard or instrument panel or by a display surface in the windshield, in which the perspective image is projected.

The progress along the traveled path is preferably continuously updated in the display in accordance with the natural course of the stretch of road lying ahead. For this, the image element is appropriately changed, for example the roadway is represented with the greatest possible reality with characterizing bends, curves, changes in elevation and/or road crossings. Beyond this, the represented course of the roadway can be influenced by ones own driving characteristics, for example ones own speed. For this, the preceding roadway preferably exhibits multiple segments. Thereby it is possible in a particularly simple mode and manner to conform the speed of ones own vehicle on the roadway to a desired spacing of the vehicle from a preceding object, using a filled-in segment or a marking, which could be represented in particular in the form of a transverse bar across the roadway display. The length of the filled in segment or the distance of the marking of the transverse/spacing bar from the zero point corresponds herein to approximately the predetermined length of the desired spacing. Alternatively, in place of a desired spacing, it is also possible, using ones instantaneous own speed, to display the required braking distance.

The roadway is beyond this supplementally represented using characterizing roadway markings such as for example roadside edges and/or centerlines. For this, preferably additional image elements are generated—for example, traffic signs, depending upon the situation. That is, in particular the actual traffic signs are preferably identified and, for example, using a control unit, are incorporated into the display, to the extent that they are relevant to the preceding roadway. Further, as an additional image element, a silhouette of a vehicle is projected onto the perspective representation of the roadway for a vehicle in the preceding roadway in the path of the present vehicle. As additional or alternative image elements the physical characteristics, for example the actual speed of ones own vehicle or the braking distance or desired spacing preceding ones own vehicle, can be generated and displayed in the image using measuring technical means. For a particularly realistic reproduction of the view of the occupant the objects represented by means of the image elements, such as for example the traffic signs, are provided with the shading or shadows occurring in reality. The number and the type of the displayed image elements can be greatly varied. Depending upon the embodiment only a single image element, for example, only the roadway as such or differentiated by multiple segments, may be represented.

Beyond this, alternatively or additionally a tachometer or speedometer scale is preferably displayed in the plane as an image element. Therein the actual speed of ones own vehicle or the acceleration thereof is provided in the form of an incorporated spotlight or a rolling ball on the tachometer scale. Further, this image element is preferably incorporated in as soon as the vehicle begins to move. As overall image element the speedometer or tachometer scale is preferably an image element blended into or superimposed over the roadway. Thereby the speedometer or tachometer scale is preferably adapted to the profile of the roadway in accordance with the vehicle operation dynamic characteristics. Preferably, the speedometer or tachometer scale follows the contour of the centerline of the roadway. The speedometer or tachometer scale values are preferably incorporated or blended into the intermediate spaces of the interrupted road centerlines. Therein, the values are preferably displayed without units, so that the tachometer scale is valid both for a display in miles per hour as well as in kilometers per hour.

As operating parameter of the own vehicle, speed is the preferably determined parameter. This is displayed as an image element, as already described above, in the form a spotlight upon a blended-in speedometer scale. Thereby it is possible to easily visualize the situation resulting from ones own speed. Beyond this, preferably as parameter for an object lying in the path of the vehicle, the speed thereof, the type thereof and/or the dimensions or measurements thereof are determined, in particular depending upon the distance from ones own vehicle. Depending upon relevancy for the present instantaneous operating situation or depending upon requirements, the object is preferably displayed as an image element. Preferably additionally or alternatively a traffic sign identified as the object can be evaluated for relevance, for example, in view of a speed limitation, or a preceding vehicle can be evaluated for operating safety, and in accordance therewith be generated as an image element to be incorporated in the display.

In further advantageous embodiments, upon exceeding or not attaining a threshold value for a characteristic of the vehicle, an operating parameter of the vehicle, a parameter of an object and/or the image element, an acoustic and/or optical signal can be emitted. For example, a minimum distance from the vehicle to an object preceding the vehicle in the roadway can be input as intended value or threshold value. Preferably, upon going below the threshold, the relevant segment of the roadway is represented by a different color, in particular red or orange. If the spacing of the vehicle to the preceding object is sufficiently large, that is, the threshold is sufficiently exceeded, then the corresponding segment of the roadway is represented in white. A further example would be the exceeding of the acceptable speed of ones own vehicle for the present road condition. For this, an acoustic tone is preferably emitted, the tachometer scale is appropriately changed in color, that is in red color, and/or the speedometer or tachometer scale is generated or displayed in such a manner, that it for example no longer follows the contour of the course of the roadway. Alternatively or additionally, in the case of a braking or speed limitation system, the speed of ones own vehicle can automatically be appropriately restricted.

Beyond this the respective image element of the generated object, that is, the preceding vehicle and/or the preceding roadway, can be continuously changed with reference to the orientation or distance and positioned in the represented roadway as the distance between the concerned vehicle and the identified object, for example a preceding vehicle, becomes smaller or larger. Further, upon dropping below a threshold of the generated image element, for example upon falling below the minimal acceptable graphic resolution of the image element, depending upon the resolution of the display, the concerned image element can be deleted or can be represented as a point (smallest representable size in the display). In addition, an acoustic signal can be emitted as a warning sound.

Preferably, the threshold value is preset or predetermined. For this, for example, the threshold value for the threshold distance is modified as a set function depending upon the speed of the concerned vehicle. Beyond this, as threshold value the respective maximal and/or minimal possible graphic size of each image element is predetermined.

Preferably, the actual detected value of the operating parameter and/or the parameter of the object is displayed as a further image element. The display generation or output thereby occurs preferably as numeric and/or alphanumeric representation. For example, as operating parameter the actual speed of ones own vehicle and/or the actual speed of a preceding vehicle is numerically incorporated into the display. In addition or alternatively the actual distance between the two objects can be incorporated numerically in the display.

The second mentioned task is inventively solved by a display device for at least one occupant of a vehicle with a segment for the display of a perspective representation of the ahead-lying roadway with an area for an image element, wherein the image element is changed in at least one characteristic or value depending on the forward travel way (roadway), one operational parameter of the motor vehicle, and/or at least one parameter of an object identified in the environment of the travel. Preferred as changeable characteristic of the image element is the shape, color, position and/or dimension thereof.

For a particularly safe guidance of the vehicle, there is preferably provided as an image element a three-dimensional representation of the roadway. This makes possible, particularly from the operator a perspective, representation of a substantial area in the operating environment. Therewith a virtual display of the vehicle operating situation is produced for the operator, which is intuitively simple to grasp.

For recognition of the roadway, the operating parameters and/or the parameters of the object, at least one measurement technical means is provided. For example, as a measurement technical means for the operating parameter "speed", the speedometer of the concerned vehicle can be employed. For detecting the roadway, an optical camera is preferably employed. In particular, for a night representation of the vehicle operating situation, a thermal imaging camera or an infrared camera is preferably provided as measurement technical means for identification of objects in the roadway. Therewith it is ensured that the operator is informed, by means of the display device, of objects relevant to the vehicle operating situation before ones own detection thereof, wherein these are already positioned and represented in the image according to the instantaneous operating situation. Beyond this, additional vehicle internal and/or external sensors or information systems can be provided, for example a vehicle internal navigation and/or distance maintaining system, for example employing a radar system. As vehicle external system one could mention for example a speed governing system or other radio operated system. Alternatively or additionally, for determining the roadway and/or other parameters of the object, a map or navigation information system can be employed. For example, by means of the navigation information system, the course of the roadway or information regarding the beginning and/or end of a zone is automatically generated as an appropriate image element in the display. Depending upon the type and model (scope of the detailed information) of the navigation information system, the need for extensive measurement technical means, and therewith the complex data processing, can preferably be reduced. As navigation information system there is employed preferably a digital recording medium, for example a CD-ROM or an alternating-CD-ROM-player.

For the reliable display of a danger situation, which was determined using a control or evaluation unit from the values from the measurement technical means, here also for the display of various traffic situations the segment is preferably a multi-colored segment. Thereby the roadway in particular is preferably represented in color. That is, by using appropriate color designs for the roadway, in particular a segment thereof, it is possible to represent for example the threshold value for the distance separation required between the vehicle and an object in the roadway depending upon the present speed of the vehicle. Alternatively or additionally the necessary braking distance can be incorporated as a segment.

For signaling a possible danger situation, for example in the case of insufficient separation to an object in the roadway, a supplemental acoustic and/or optical emitter element is provided. Alternatively or additionally the relevant image element—the relevant segment of the roadway—can be characterized by an appropriate color—red or orange. Preferably a number of image elements is provided corresponding to the number of the identified objects. Beyond this, as desired, further image elements can be provided in the segment, for example one image element for the roadway, for the identified object or for at least one operating parameter of one's own vehicle.

Preferably the display device is employable in the vehicle in combination with a distance monitor, a speed governor and/or a navigation system. Thereby there is, for example, in a special vehicle operating situation in which the conventional distance maintaining control system relinquishes the control to the vehicle operator, an additional display made possible on the display device, which presents the actual driving situation in perspective view. By the combination of the display device with a navigation system additionally or alternatively recommended directions at crossing situations as well as in certain cases traffic jam and/or delay warnings can be incorporated in the form of image elements.

The advantages achieved by the present invention are comprised particularly therein, that by the perspective, in particular three dimensional representation of the vehicle operating environment with the aid of at least one image element and the continuous update or conforming thereof to the vehicle operating situation in at least one characteristic, the occupant, in particular the vehicle operator, can grasp simply and rapidly information relevant to operating the vehicle. This is in particular facilitated by the representation of the vehicle situation in an occupant compatible representation in the form of a virtual image. The need for interpretation or decoding, which has been associated with conventional displays, and which lead to an increased burden on the vehicle occupants, is therewith avoided. Therewith the occupant can direct more attention to the avoidance or minimization of the danger situation. Therewith the operational safety is improved.

BRIEF DESCRIPTION OF THE DRAWINGS

Illustrative embodiments of the invention are shown in greater detail on the basis of figures. Therein there is shown.

DETAILED DESCRIPTION OF THE INVENTION

The same elements are indicated in the figures with the same reference numbers.

Figure 1:
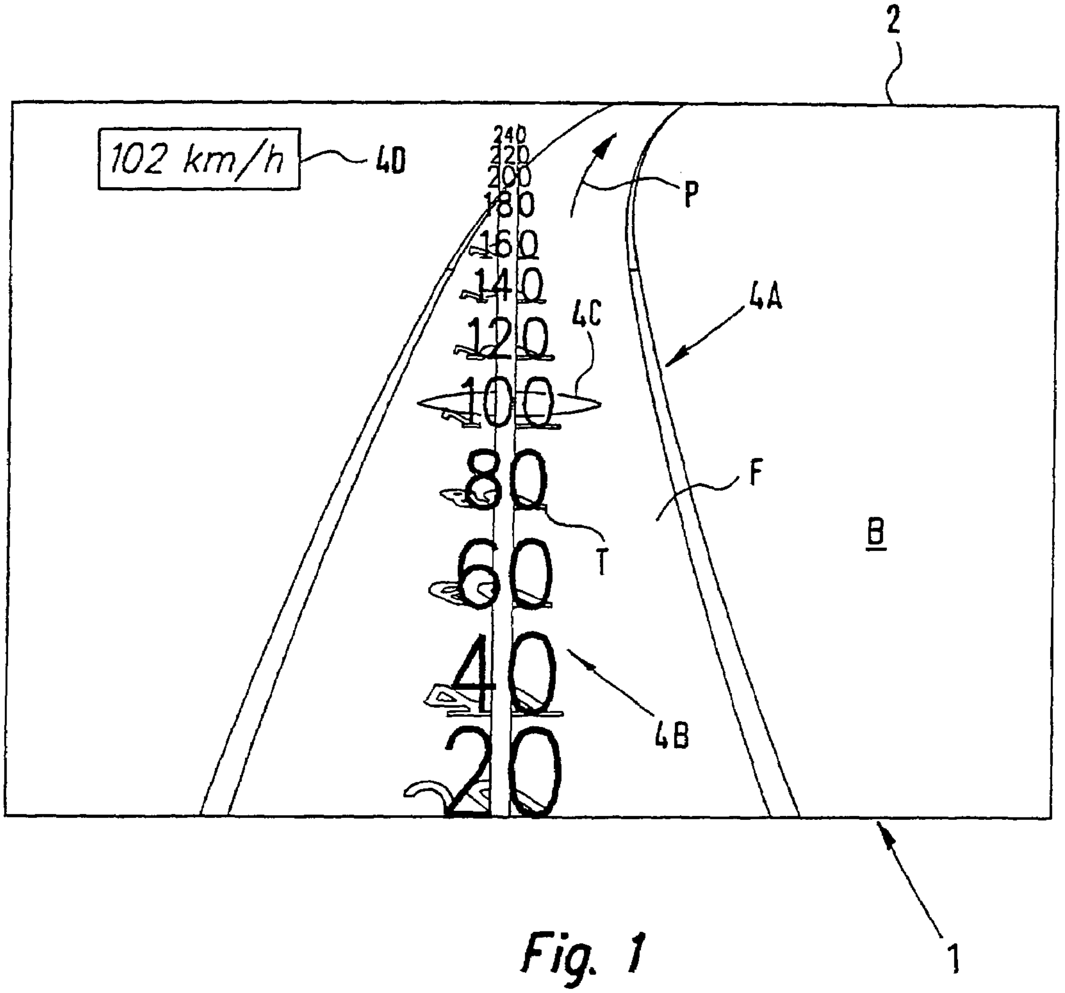
FIG. 1 schematic of display device with a segment for an image with an image element, FIGS. 2 through 4 schematic of the display device according to FIG. 1 with multiple alternatives for various images with multiple image elements, and FIG. 5 a perspective image of the display device.

A display device 1 according to FIG. 1 includes a segment 2 for display of a perspective image B with an image element 4A for a preceding roadway F with a direction of travel indicated schematically with the arrow P. The respective images B in FIGS. 1 through 4 are schematically represented on a plane. The three dimensional representation of the image B with the image element 4A is shown for example in FIG. 5. Preferably a segment 2 is a multicolored segment. By connecting the display device 1 with a navigation system the contour of the roadway F is appropriately curved, raised or as the case may be interrupted on the basis of data such as curves, bridges, road crossing, etc. provided by the navigation system. Therewith the roadway F in the display B substantially follows the natural course of a roadway to be traveled, in particular the course of a road.

The roadway F for the respective image B is projected onto a plane which is elevated to the perspective or view of an occupant, in particular the operator of the vehicle. Beyond this as a further image element 4B a speedometer scale T is projected into the roadway F. Alternatively the speedometer scale T could also be projected as an independent image element 4B in the display B without the roadway F. Depending upon the type and comprehensiveness of data from further systems such as navigation systems, information systems or radar systems, the speedometer scale T in the display B can follow the natural course of the road ahead.

As an operating parameter of one's own vehicle, not shown, the speed thereof is incorporated in display B in particular onto the speedometer scale T using a further image element 4C. As a further operating parameter of one's own vehicle one's own instantaneous position on the roadway is continuously indicated. For this the operating parameters are detected by means of not shown measurement technical means such as for example sensors, optical systems, thermal imaging cameras, radar systems and/or information systems. By the position of the image element 4C onto the speedometer scale T the instantaneous speed of one's own vehicle can be read off as being approximately 90 km/h or mph. As image element 4C for example a stoplight, a bar or a rolling ball can be employed. Alternatively or additionally the numeric numbers of the tachometer scale T which correspond approximately to the instantaneous speed of one's own vehicle, can be marked with color or changed in color.

Depending upon the operating parameter of one's own vehicle the image element 4C changes in position. That is upon acceleration or braking the image element 4C drifts in the tachometer scale T in the direction of the respective value of the instantaneous speed. In the case of the numeric display of the speed the appropriate numbers of the tachometer scale T change in color. For example, only the respective number is colored in red, which corresponds to the instantaneous speed of one's own vehicle. All other numbers of the tachometer scale T are displayed in white. Alternatively, those respective numbers, of which the value is smaller than the value of the instantaneous speed, can be colored with a first color. Those numbers, of which the value is greater than the instantaneous value of one's own speed can accordingly be represented in a different color.

Beyond this, depending upon preferences, the actual value of the speed (present speed), the desired speed of the activated cruise control and/or a threshold value of the highest speed permissible under the present conditions for the immediately preceding roadway F, can be presented alpha numerically or numerically as a further image element 4D.

Figure 2:
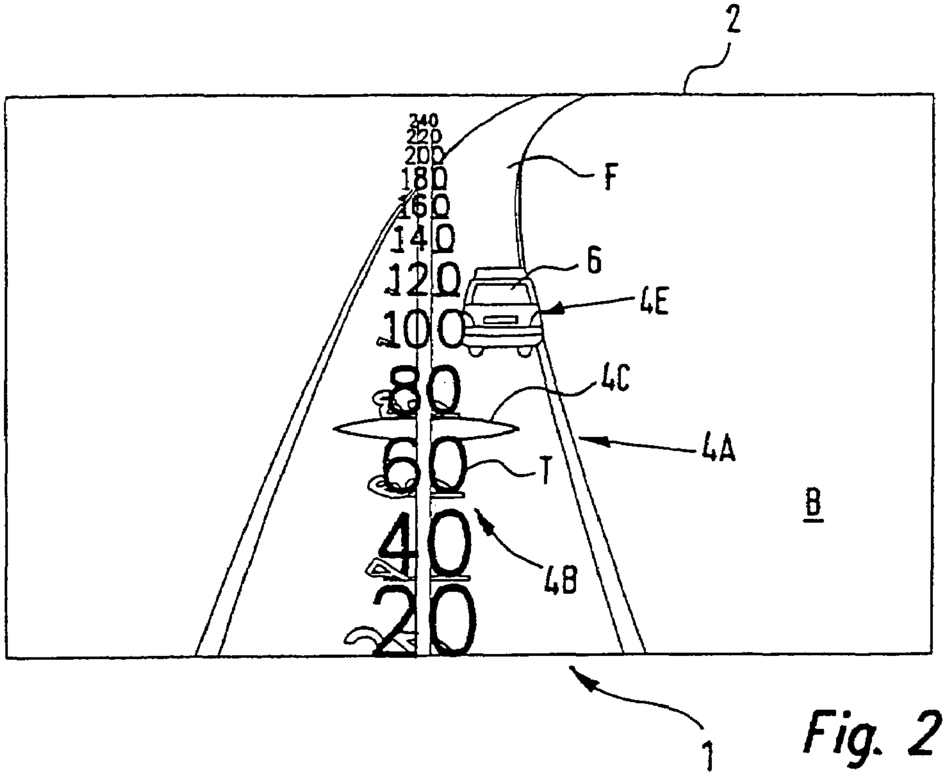

In FIG. 2 the display device 1 is shown with the segment 2 for an alternative display B with a number of image elements 4A through 4C, 4E.

An object 6 identified in the area of the roadway F, for example a vehicle driving or standing in the road ahead, is shown as a image element 4E. The image element 4E is therein preferably represented as a symbol characterizing the object 6—a three-dimensional vehicle silhouette. The image element 4E of the object 6 is shown in a shape, dimension and/or position corresponding to the present distance from one's own vehicle. As the distance of the detected object 6 from one's own vehicle increases or decreases, so the associated image element 4E and the display B is appropriately adapted in at least one characteristic, for example shape, measurement and/or position.

The position of the image element 4E of the object 6 (= the preceding vehicle) in display B relative to the image element 4C (=spotlight for the speed of one's own vehicle) represents the maintenance of the separation required for the instantaneous speed. According to the present example in FIG. 2 the preceding vehicle (image element 4E) is positioned in the direction of travel below the spotlight (image element 4C). That means that the safe distance at the present speed of approximately 90 km/h or mph is sufficiently large, in order that in the case of a emergency braking one's own vehicle can be safely stopped in advance of the preceding vehicle.

Figure 3:
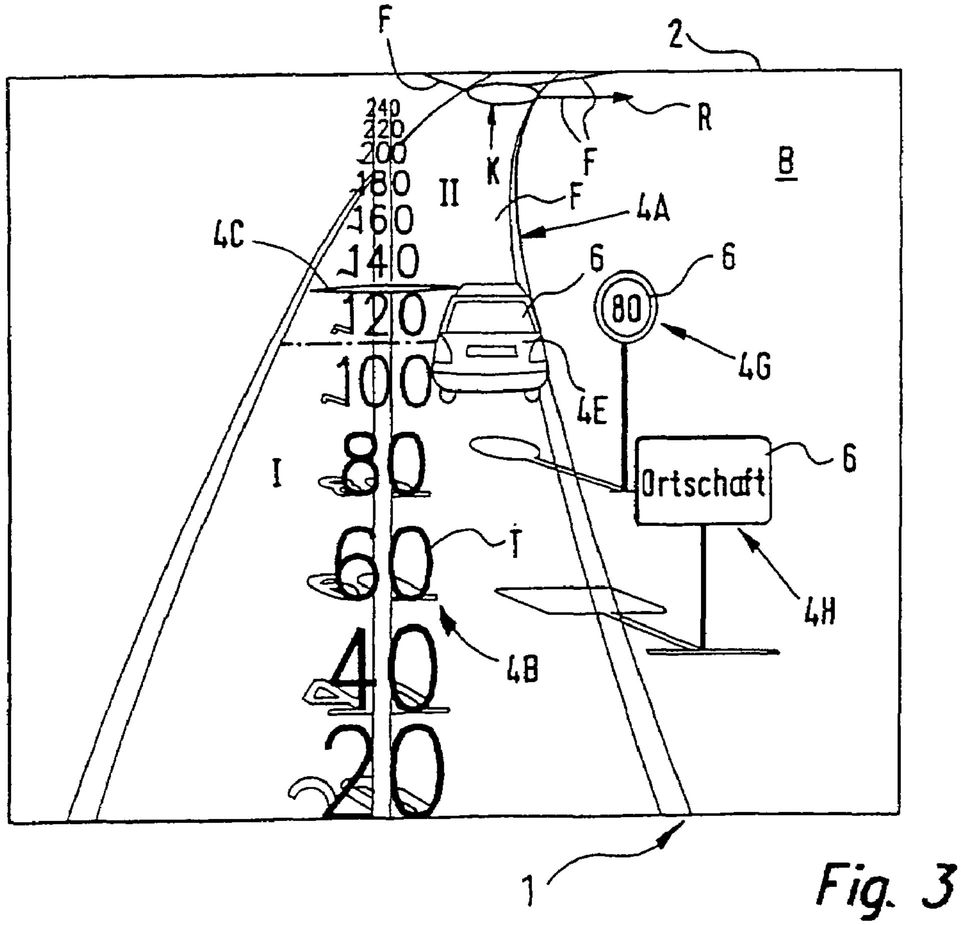

An example of the not maintaining of the safe separation is shown in FIG. 3. Here the preceding vehicle (image element 4E) is positioned in the direction of travel ahead of the image element 4C, which represents the instantaneous speed of one's own vehicle. Therewith the instantaneous own speed of approximately 90 km/h is too high relative to the brake distance required in the case of an emergency braking and accordingly the threshold value to the preceding vehicle is not sufficient. This is indicated by an appropriate coloration of the image element 4C and/or the corresponding numbers "80", "100" and "110" of the speedometer scale T which indicate a too high a value for one's present speed. By reducing one's own speed to a value below 80 km/h the necessary safe distance to the preceding vehicle is substantially maintained. By combination of the display device 1 with a distance maintaining control and/or brake assistant system the speed of one's own vehicle can be automatically reduced for example upon dropping below the threshold for the safe spacing.

Alternatively, depending upon the changing operating parameters of the vehicle—speed of one's own vehicle—the image element 4A for the roadway F can be subdivided into multiple segments I and II, which are respectively displayed in different colors. For signaling a dangerous situation for the occupants the segment I is appropriately covered with a signal color, for example red or orange. Additionally or alternatively an alarm or signal is emitted using a not shown acoustic emitter. The segment I represents the brake distance which one's own vehicle requires in an emergency situation, depending upon the instantaneous own speed, as shown in image element 4C. With increasing or decreasing speed of one's own vehicle the size of the image element 4E of this position changes—moves backwards or as the case may be forwards.

In the case, that the display device 1 is connected to a navigation system, a road crossing K lying in the area of the roadway F is represented in a further image element 4F. The term "crossing" K is herein intended to refer to the crossing or junction of at least two roadways F. Depending upon the mode and design of the display device 1 and the navigation system it is possible by appropriate direction indications R to display for the vehicle occupants at the crossing K the future desired direction of travel on the roadway F, for example turning off to the right.

As further traffic information a traffic sign is displayed in the display B by a supplemental image element 4G, which sign has been identified as an object 6 in the area of the roadway F by means of a not shown measurement technical means. Depending upon type of the identified object 6, the image element 4G can be incorporated and displayed in the display B for so long, in particular in the course of the roadway F to be traveled, until the information associated therewith, for example a speed limitation, is no longer valid.

The same applies for further image elements 4H, which represent for example a special zone. Further, in particular by the employment of a thermal imaging camera it becomes possible to represent with an appropriate element 4E in display B a relevant object 6, for example a pedestrian or an un-illuminated preceding vehicle, which can be displayed significantly before the operator of the vehicle at night can detect the object on his own.

Alternatively or additionally, for determining the path of travel and/or the parameters of the object 6 a not shown mapping or navigation system can be employed. For example using a map display the course of the roadway F or information regarding the beginning and/or end of localities can be automatically provided as appropriate image elements 4A or as the case may be 4H in the display B. As map or navigation system one could employ a digital memory such as for example a CD-ROM.

A further alternative preferred embodiment of the display device 1 is characterized by providing at least one parameter of the identified object 6. For this a not shown measurement technical means such as for example sensors, cameras, radar systems, optical systems and/or information systems can be used for detecting the speed, the type and/or the dimensions of the object 6 to be identified. For example it is possible, as shown in FIG. 1 for one's own vehicle, that in a further not shown image element the speed and/or the type of the identified object 6 (=preceding vehicle) is provided alpha numerically. In the case of a vehicle in particular the license plate thereof can be displayed alpha numerically as an image element. Preferably the type of the identified object 6 is provided in the form of a graphic symbol—here an automobile silhouette. Alternatively or additionally the speed of the object 6 could be optically incorporated in the speedometer scale T as an additionally spotlight.

Depending upon the type and design of the above described display device 1 this can be connected with a not shown system, for example a navigation system or a distance maintaining control, in such a manner, that even following deactivation of the distance maintaining control on the basis of exceeding and/or falling below acceptable threshold values the operator or occupants of the vehicle continue to have a good overview of the traffic situation by means of the display B in segment 2, in particular have an overview of all information necessary for operating, so that actions can be rapidly and safely carried out.

Figure 4:
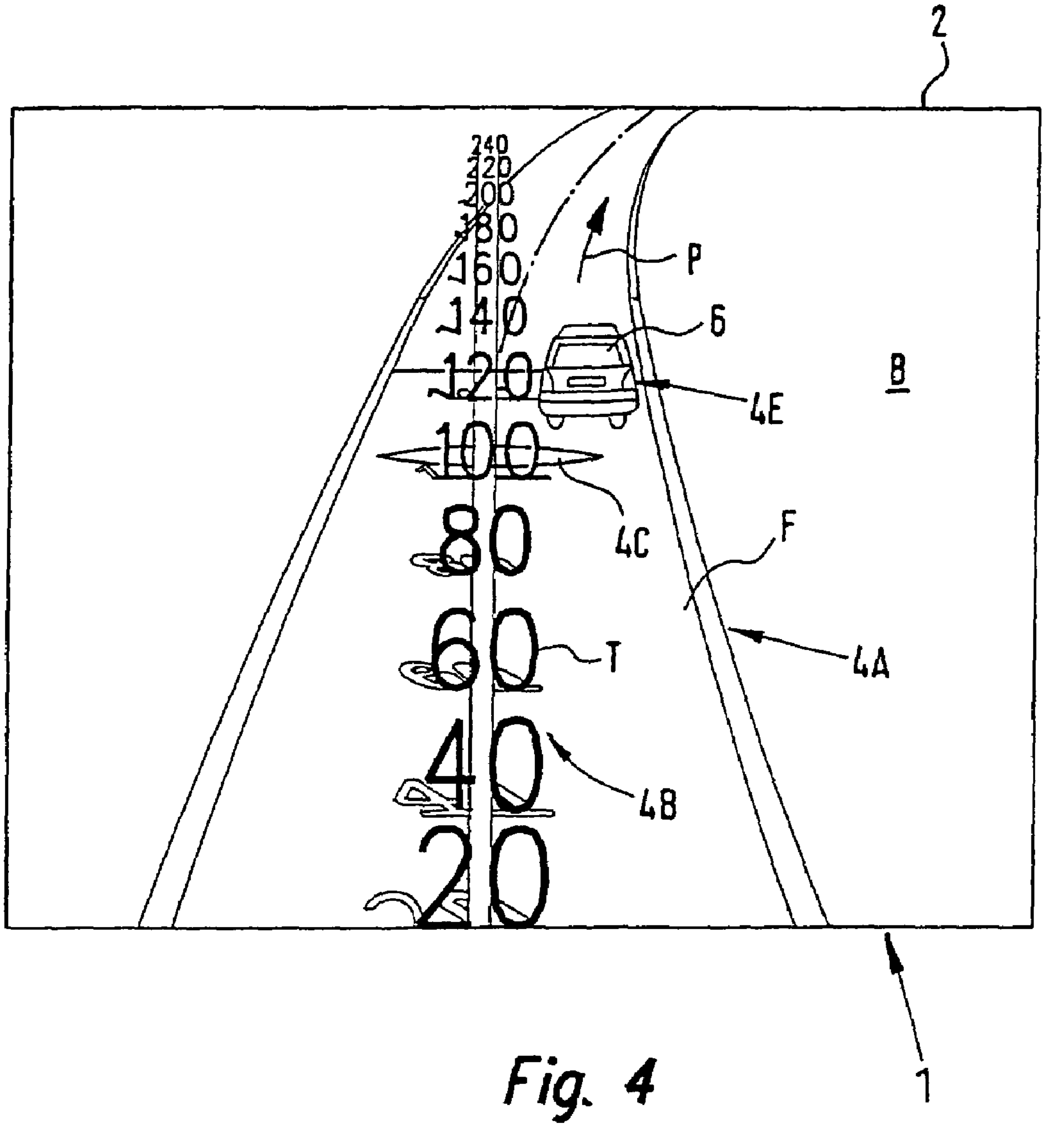

In FIG. 4 a further embodiment is shown for the display device 1 with a further alternative display B. Here the threshold separation from the preceding object 6 is maintained. The roadway F is curved in the direction of travel according to arrow P. The maximal permissible speed of one's own vehicle for this curve may not exceed 80 km/h or mph. This is however here the case—indicated by the image element 4C, which indicates as instantaneous speed of one's own vehicle a value of approximately 102 km/h or mph. Therewith the permissible speed of 80 km/h or mph is substantially exceeded. This fact is signaled to the occupants by means of a suitable color marking of the image element 4C. Alternatively or supplementally the numbers of the speedometer scale T, which represent the value substantially greater than the maximal permissible speed, are characterized by appropriate coloration. A further alternative is comprised therein, that the speedometer scale T no longer follows the course of the roadway F. Rather the occupants are signaled by the deviation of the speedometer scale T from the roadway F according to vehicle dynamic limitations, that a danger situation would exist in the roadway ahead if the present speed is maintained, so that in particular the operator of the vehicle can react in rapid and simple manner.

Figure 5:
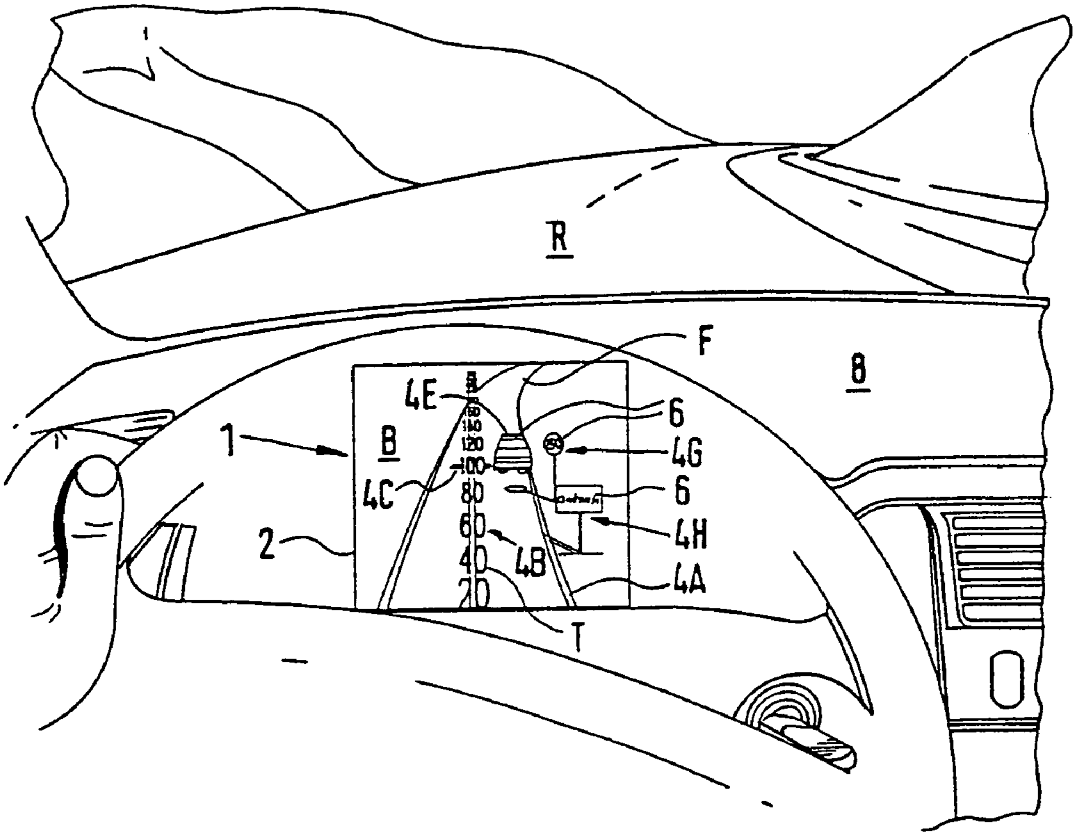

In FIG. 5 an example of a perspective image B of a display device 1 incorporated into a dashboard 8 is shown. Here the three dimensional representation of the image B is in the form of a particularly ergonomic display of a perspective seen in the direction of travel R by the occupants of the vehicle in an elevated position, as schematically shown in FIGS. 1 through 4.

What is claimed is:

1. A process for displaying a perspective image (B) with an image element (4A through 4H) for at least one occupant of a vehicle, wherein the image (B) represents the perspective of the occupant, said process comprising:

generating a virtual display representing the operating environment of the vehicle, displaying within the virtual display the image element (4A through 4H) as a three dimensional image, changing at least one characteristic of an image element (4A through 4H) depending at least one of:

the roadway ahead (F), an operating parameter of the vehicle, and a parameter of an object (6) identified in the area of the vehicle preceding roadway (F), wherein said display includes at least one three dimensional image element representing an operating parameter or providing warning information, and wherein the contour of the roadway (F) in the display (B) is continuously conformed to the natural course of the stretch of road ahead of the vehicle.

2. A process according to claim 1, wherein the change in the image element (4A through 4H) is a change in shape, color, position and/or dimension.

3. A process according to claim 1, wherein the roadway (F) is displayed as an image element (4A).

4. A process according to claim 1, wherein the contour of the roadway (F) in the display (B) is continuously conformed to the natural course of the stretch of road ahead of the vehicle.

5. A process according to claim 1, wherein a speedometer or tachometer scale (T) is provided as an image element (4B).

6. A process according to claim 5, wherein the speedometer or tachometer scale (T) is continuously conformed to the contour of the roadway (F).

7. A process according to claim 1, wherein the speed of the vehicle is detected as an operating parameter.

8. A process according to claim 1, wherein the operating parameter of the vehicle is provided as an image element (4D).

9. A process according to claim 1, wherein the speed, type and/or dimension of the object (6) is determined and evaluated as a parameter.

10. A process according to claim 1, wherein the object (6) in the area of the roadway (F) is classified and evaluated as to a type selected from the group consisting of vehicle, obstacle, pedestrian and/or traffic sign.

11. A process according to claim 1, wherein a symbol representing the object (6) is provided as an image element (4E, 4G through 4H).

12. A process according to claim 1, wherein the actual detected value of the operating parameter of the vehicle and/or the parameter of the object (6) is provided as an image element (4D).

13. A process according to claim 1, wherein an acoustic and/or an optical signal is emitted upon exceeding and/or falling below a threshold value for a characteristic of the roadway (F), the operating parameter of the vehicle, or a parameter of the object (6) or the image elements (4A through 4H).

14. A process according to claim 13, wherein the threshold value is preset.

15. A process according to claim 5, wherein the threshold value is preset, and wherein the displayed speedometer or tachometer scale (T) is changed in at least one characteristic upon exceeding and/or falling below the threshold value of the vehicle (F), the operating parameters of the vehicle and/or the parameters of the object (6).

16. A process according to claim 1, wherein a directional indicator for the roadway preceding ones own vehicle is provided as an image element (4F).

17. A process according to claim 1, wherein the image (B) is displayed on a display surface in the dashboard or instrument panel (8) or in the field of view of the windshield of the vehicle.

18. A display device (1) for at least one occupant of a vehicle, including a segment (2) for display of a perspective image (B) of a preceding roadway (F) including an area for at least one image element (4A through 4H), wherein the image element (4A through 4H) is changeable in at least one characteristic depending upon the preceding roadway (F), at least one operating parameter of the vehicle and/or at least one parameter of an object (6) identified in the roadway (F)

wherein said display device is capable of generating a three-dimensionalized representation of the image element (4A through 4H) within a three-dimensional image (B) representing the vehicle operating environment, and wherein said image (B) includes at least one three dimensional image element representing an operating parameter or providing warning information, and wherein the contour of the roadway (F) in the display (B) is continuously conformed to the natural course of the stretch of road ahead of the vehicle.

19. A display device (1) according to claim 18, wherein as characteristic of the image element (4A through 4H) the shape, color, position and/or dimension thereof is changeable.

20. A display device (1) according to claim 18, wherein a roadway (F), represented three dimensionally, is provided as image element (4A).

21. A display device (1) according to claim 18, wherein at least one measurement technical means is provided for determining the vehicle path (F), the operating parameter of the vehicle and/or the parameter of the object (6).

22. A display device (1) according to claim 18, wherein a navigation information system is provided for providing information regarding the roadway (F) and/or the object (6).

23. A display device (1) according to claim 18, wherein the segment (2) is a multi-color segment.

24. A display device (1) according to claim 18, further including an acoustic emitter is provided.

* * * * *